United States Patent
Ma et al.

(10) Patent No.: US 12,519,687 B2
(45) Date of Patent: Jan. 6, 2026

(54) METHOD AND APPARATUS FOR DETERMINING NETWORK FAULT ROOT CAUSE

(71) Applicant: Huawei Technologies Co., Ltd., Shenzhen (CN)

(72) Inventors: Qinggao Ma, Shenzhen (CN); Caijian Mai, Dongguan (CN); Mingang Liu, Dongguan (CN); Zuorong Yin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/431,436

(22) Filed: Feb. 2, 2024

(65) Prior Publication Data

US 2024/0179045 A1    May 30, 2024

Related U.S. Application Data

(63) Continuation of application No. PCT/CN2022/075602, filed on Feb. 9, 2022.

(30) Foreign Application Priority Data

Aug. 3, 2021  (CN) .......................... 202110887806.7

(51) Int. Cl.
*H04L 41/0677*  (2022.01)
*G06F 40/30*  (2020.01)
*H04L 41/0631*  (2022.01)

(52) U.S. Cl.
CPC .......... *H04L 41/0677* (2013.01); *G06F 40/30* (2020.01); *H04L 41/0631* (2013.01)

(58) Field of Classification Search
None
See application file for complete search history.

(56) References Cited

U.S. PATENT DOCUMENTS

| 6,252,852 | B1 | 6/2001 | Rowles et al. |
| 6,449,365 | B1 * | 9/2002 | Hodges ................... H04M 3/08 |
| | | | 379/1.01 |

(Continued)

FOREIGN PATENT DOCUMENTS

CN    112039706 A    12/2020

OTHER PUBLICATIONS

WO-2020228276-A1 (Machine translated English version with the original Chinese version) (Year: 2020).*

(Continued)

*Primary Examiner* — Sandarva Khanal
(74) *Attorney, Agent, or Firm* — Conley Rose, P.C.

(57) ABSTRACT

A method for determining a network fault root cause includes: receiving target network fault information entered by a user, where the target network fault information indicates that at least one network device is faulty or at least one service is faulty in a faulty network; determining a network fault type and identification information of a fault object based on the target network fault information, where the fault object includes the at least one network device or the at least one service; determining a fault root cause detection task based on the network fault type and the identification information of the fault object; and performing fault detection on the fault object based on the fault root cause detection task to obtain a fault root cause of the faulty network.

20 Claims, 9 Drawing Sheets

(56) References Cited

U.S. PATENT DOCUMENTS

| | | |
|---|---|---|
| 10,771,314 B2 | 9/2020 | Misra et al. |
| 2004/0133397 A1* | 7/2004 | Bjornson ........... G05B 23/0278 |
| | | 702/185 |
| 2005/0081118 A1* | 4/2005 | Cheston ............. G06F 11/0748 |
| | | 714/47.1 |
| 2007/0106512 A1* | 5/2007 | Acero .................. G10L 15/197 |
| | | 704/260 |
| 2007/0116185 A1* | 5/2007 | Savoor ................ H04M 3/5191 |
| | | 379/9 |
| 2007/0192306 A1* | 8/2007 | Papakonstantinou ....................... |
| | | G06F 16/951 |
| | | 707/999.005 |
| 2015/0288557 A1* | 10/2015 | Gates ................. G06F 11/0709 |
| | | 714/37 |
| 2017/0019291 A1* | 1/2017 | Tapia ...................... H04L 41/16 |
| 2018/0173217 A1* | 6/2018 | Spiro .................. G05B 23/024 |
| 2019/0034937 A1* | 1/2019 | Zhang .................... G06N 5/022 |
| 2020/0133698 A1* | 4/2020 | Permenter ............. H01H 13/14 |
| 2020/0259700 A1* | 8/2020 | Bhalla .................. G06F 3/0482 |
| 2022/0327035 A1* | 10/2022 | Shen ................... G06F 11/2263 |

OTHER PUBLICATIONS

Weibin Meng et al.:"LogClass: Anomalous Log Identification and Classification With Partial Labels" IEEE Transactions on Network and Service Management, vol. 18, No. 2, Jan. 28, 2021, XP011859930, total 15 pages.

\* cited by examiner

METHOD AND APPARATUS FOR DETERMINING NETWORK FAULT ROOT CAUSE

CROSS-REFERENCE TO RELATED APPLICATIONS

This is a continuation of International Patent Application No. PCT/CN2022/075602 filed on Feb. 9, 2022, which claims priority to Chinese Patent Application No. 202110887806.7 filed on Aug. 3, 2021, which are hereby incorporated by reference.

TECHNICAL FIELD

This disclosure relates to the field of communication technologies, and in particular, to a method and apparatus for determining a network fault root cause, a device, and a storage medium.

BACKGROUND

With the rapid development and expansion of communication network technologies, communication technologies are more widely applied in various fields of human activities. During running of a network, a network fault usually occurs, which affects user experience of using the network.

When a fault occurs in the network, a network device may generate a large amount of alarm information and record the alarm information in a network log, to determine a cause of the network fault based on the alarm information recorded in the network log.

However, the alarm information cannot accurately indicate a network fault root cause. Therefore, logical analysis needs to be performed on the large amount of alarm information in the network log, to determine a cause of the network fault. Therefore, efficiency of the current manner of determining the network fault is low.

SUMMARY

Embodiments of this disclosure provide a method and apparatus for determining a network fault root cause, a device, and a storage medium, so that a user may determine, in a targeted manner, a network fault type and a fault object that needs to be detected, to perform diagnosis on a network fault in a targeted manner, to obtain the network fault root cause without analyzing a large amount of alarm information. This improves efficiency of determining the network fault root cause.

According to a first aspect, embodiments of this disclosure provide a method for determining a network fault root cause. The method may include receiving target network fault information entered by a user, where the target network fault information indicates that at least one network device is faulty or at least one service is faulty in a faulty network, determining a network fault type and identification information of a fault object based on the target network fault information, where the fault object includes the at least one network device or the at least one service, determining a fault root cause detection task based on the network fault type and the identification information of the fault object, and performing fault detection on the fault object based on the fault root cause detection task, to obtain a fault root cause of the faulty network.

In this solution, a network being faulty is usually represented as a faulty network device or a faulty service. Network operation and management personnel enters the target network fault information based on the faulty network device or service. A network fault type and a fault object that needs to be detected may be determined based on the target network fault information. A fault root cause detection task may be determined based on the network fault type and the identification information of the fault object, and then fault detection is performed on the fault object. In this way, the fault object that needs to be detected and a detection task that needs to be performed when the fault object is detected may be determined in a targeted manner through the target network fault information entered by the user, so that the network fault root cause is determined, and there is no need to perform logical analysis on a large amount of alarm information. This improves efficiency of determining the network fault root cause.

In a possible implementation, the method may further include displaying the fault root cause on a network fault interaction interface, to repair the faulty network based on the fault root cause.

In a possible implementation, determining a fault root cause detection task based on the network fault type and the identification information of the fault object includes invoking a fault detection form corresponding to the network fault type, and filling in slot information of a plurality of slots in the network fault detection form based on the identification information of the fault object, to obtain the fault root cause detection task. Therefore, the fault root cause detection task may be determined in a targeted manner based on the identification information of the fault object.

In a possible implementation, filling in slot information of a plurality of slots in the network fault detection form based on the identification information of the fault object, to obtain the fault root cause detection task includes, when the identification information of the fault object does not include slot information of a mandatory slot in the plurality of slots, matching the slot information of the mandatory slot from a database based on the identification information of the fault object, and filling in the slot information of the plurality of slots in the network fault detection form based on the identification information of the fault object and the slot information of the mandatory slot, to obtain the fault root cause detection task. Therefore, an accurate fault root cause detection task may be obtained, and accuracy of determining the network fault root cause may be ensured.

In a possible implementation, filling in slot information of a plurality of slots in the network fault detection form based on the identification information of the fault object, to obtain the fault root cause detection task includes outputting inquiry information corresponding to a mandatory slot when the identification information of the fault object does not include slot information of the mandatory slot in the plurality of slots, receiving a first input of the user, extracting the slot information of the mandatory slot from the first input in response to the first input, and filling in the slot information of the plurality of slots in the network fault detection form based on the identification information of the fault object and the slot information of the mandatory slot, to obtain the fault root cause detection task. Therefore, the slot information used when the fault root cause detection task is performed is obtained in a manner of manual interaction with the user. This improves accuracy of the fault root cause detection task, and improves accuracy of determining the network fault root cause.

In a possible implementation, determining a fault type and identification information of a fault object based on the target network fault information includes performing semantic analysis on the target network fault information, to determine the network fault type and the identification information of the fault object. Therefore, an intention of the target network fault information entered by the user may be identified, and the network fault type and the identification information of the fault object may be determined in a targeted manner, so that network fault detection is performed in a targeted manner, and efficiency of network fault detection is improved.

In a possible implementation, performing semantic analysis on the target network fault information, to determine the network fault type and the identification information of the fault object includes performing semantic analysis on the target network fault information, to determine the network fault type, and performing word segmentation processing on the target network fault information, to determine the identification information of the fault object.

In a possible implementation, performing word segmentation processing on the target network fault information, to determine the identification information of the fault object includes performing word segmentation processing on the target network fault information, to obtain at least one word corresponding to the target network fault information, calculating a word frequency of each word based on identification information of a plurality of fault objects stored in a database and service information configured by each network device, calculating an inverted index weight of the word based on a historical fault detection task stored in the database, calculating a relative matching score between the target network fault information and the historical fault detection task, calculating a relative score of the word based on the word frequency of the word, the inverted index weight of the word, and a relative matching score of the word, and determining the identification information of the fault object based on a preset score threshold and the relative score. Therefore, accuracy of the identification information of the fault object may be improved. This improves accuracy of determining the network fault root cause.

In a possible implementation, performing semantic analysis on the target network fault information, to determine the network fault type includes inputting the target network fault information into a pre-trained semantic analysis model, and determining the network fault type, where the semantic analysis model is obtained by training based on network fault sample information and a network fault type corresponding to the network fault sample information.

In a possible implementation, the method may further include performing incremental learning on the semantic analysis model based on historical network fault information and a network fault type corresponding to the historical network fault information.

In a possible implementation, before receiving target network fault information entered by a user, the method may further include orchestrating network fault detection subtasks based on different network fault types, to obtain a fault detection form corresponding to each network fault type.

In a possible implementation, performing fault detection on the network device based on the identification information of the fault object and the fault root cause detection task, to obtain the fault root cause of the faulty network includes sending the fault root cause detection task to a network management device, to enable the target device to perform the fault root cause detection task, to obtain status information of the fault object, receiving the status information fed back by the network management device, and performing fault analysis based on the status information, to obtain the fault root cause. Therefore, the network management device performs the fault root cause detection task, to obtain the status information of the fault object, and determine the fault root cause. This improves efficiency of determining the network fault root cause.

In a possible implementation, receiving target network fault information entered by a user includes receiving a second input of the user, extracting a network fault keyword from the second input in response to the second input, matching at least one piece of network fault information that includes the network fault keyword, displaying the at least one piece of network fault information, receiving a third input of the user, and determining the target network fault information in response to the third input, where the at least one piece of network fault information includes the target network fault information. Therefore, the network fault information may be associated through the network fault keyword, to obtain the at least one piece of network fault information. Then, the user selects the target network fault information, so that the network fault information may be accurately determined. This improves accuracy of a network fault root cause.

According to a second aspect, embodiments of this disclosure provide an apparatus for determining a network fault root cause. The apparatus may include a receiving module configured to receive target network fault information entered by a user, where the target network fault information indicates that at least one network device is faulty or at least one service is faulty in a faulty network, an information determining module configured to determine a network fault type and identification information of a fault object based on the target network fault information, a task determining module configured to determine a fault root cause detection task based on the network fault type and the identification information of the fault object, where the fault object includes the at least one network device or the at least one service, and a detection module configured to perform fault detection on the fault object based on the fault root cause detection task, to obtain a fault root cause of the faulty network.

In a possible implementation, the apparatus further includes a display module configured to display the fault root cause on a network fault interaction interface, to repair the faulty network based on the fault root cause.

In a possible implementation, the task determining module includes an invoking unit configured to invoke a fault detection form corresponding to the network fault type, and a filling unit configured to fill in slot information of a plurality of slots in the network fault detection form based on the identification information of the fault object, to obtain the fault root cause detection task.

In a possible implementation, the apparatus further includes a matching module configured to, when the identification information of the fault object does not include slot information of a mandatory slot in the plurality of slots, match the slot information of the mandatory slot from a database based on the identification information of the fault object, and the filling unit configured to fill in the slot information of the plurality of slots in the network fault detection form based on the identification information of the fault object and the slot information of the mandatory slot, to obtain the fault root cause detection task.

In a possible implementation, the apparatus further includes an output module configured to output inquiry information corresponding to a mandatory slot when the identification information of the fault object does not include slot information of the mandatory slot in the plurality of slots, the receiving module, further configured to receive a first input of the user, an extraction module configured to extract the slot information of the mandatory slot from the first input in response to the first input, and the filling unit configured to fill in the slot information of the plurality of slots in the network fault detection form based on the identification information of the fault object and the slot information of the mandatory slot, to obtain the fault root cause detection task.

In a possible implementation, the information determining module is configured to perform semantic analysis on the target network fault information, to determine the network fault type and the identification information of the fault object.

In a possible implementation, the information determining module is configured to perform semantic analysis on the target network fault information, to determine the network fault type, and perform word segmentation processing on the target network fault information, to determine the identification information of the fault object.

In a possible implementation, the information determining module is configured to perform word segmentation processing on the target network fault information, to obtain at least one word corresponding to the target network fault information, calculate word frequency of each word based on identification information of a plurality of fault objects stored in a database and service information configured by each network device, calculate an inverted index weight of the word based on a historical fault detection task stored in the database, calculate a relative matching score between the target network fault information and the historical fault detection task, calculate a relative score of the word based on the word frequency of the word, the inverted index weight of the word, and a relative matching score of the word, and determine the identification information of the fault object based on a preset score threshold and the relative score.

In a possible implementation, the information determining module is configured to input the target network fault information into a pre-trained semantic analysis model, and determine the network fault type, where the semantic analysis model is obtained by training based on network fault sample information and a network fault type corresponding to the network fault sample information.

In a possible implementation, the apparatus further includes a training module configured to perform incremental learning on the semantic analysis model based on historical network fault information and a network fault type corresponding to the historical network fault information.

In a possible implementation, the apparatus further includes a task orchestration module configured to orchestrate network fault detection subtasks based on different network fault types, to obtain a fault detection form corresponding to each network fault type.

In a possible implementation, the detection module is configured to send the fault root cause detection task to a network management device, to enable the target device to perform the fault root cause detection task, to obtain status information of the fault object, the receiving module is further configured to receive the status information fed back by the network management device, and the apparatus further includes a fault analysis module configured to perform fault analysis based on the status information, to obtain the fault root cause.

In a possible implementation, the receiving module is configured to receive a second input of the user, the apparatus further includes an extraction module configured to extract a network fault keyword from the second input in response to the second input, a matching module configured to match at least one piece of network fault information that includes the network fault keyword, and a display module configured to display the at least one piece of network fault information, the receiving module is configured to receive a third input of the user, and the information determining module is configured to determine the target network fault information in response to the third input, where the at least one piece of network fault information includes the target network fault information.

According to a third aspect, embodiments of this disclosure provide a computer device, where the computer device may include a memory and a processor, and the processor executes computer instructions stored in the memory, to enable the processor to perform the method in the first aspect or any possible implementation of the first aspect.

According to a fourth aspect, embodiments of this disclosure provide a computer-readable storage medium, where the computer-readable storage medium stores a computer program, and when the computer program is executed by a processor, the method in the first aspect or any possible implementation of the first aspect is implemented.

According to a fifth aspect, embodiments of this disclosure provide a computer program product including instructions. When the instructions run on a computer, the computer is enabled to perform the method in the first aspect or any possible implementation of the first aspect.

DESCRIPTION OF EMBODIMENTS

To make objectives, technical solutions, and advantages of embodiments of this disclosure clearer, the following describes the technical solutions in embodiments of this disclosure with reference to the accompanying drawings.

In the descriptions of this embodiment of this disclosure, words such as "example", "for example", or "exemplary"

are used to represent giving an example, an illustration, or a description. Any embodiment or design scheme described as an "example", "for example", or "exemplary" in embodiments of this disclosure should not be explained as being more preferred or having more advantages than another embodiment or design scheme. Exactly, use of the word "example", "for example", "exemplary", or the like is intended to present a relative concept in a specific manner.

In the descriptions of embodiments of this disclosure, the term "and/or" describes only an association relationship for describing associated objects and represents that three relationships may exist. For example, A and/or B may represent the following three cases: only A exists, both A and B exist, and only B exists. In addition, unless otherwise specified, the term "a plurality" means two or more. For example, a plurality of systems refer to two or more systems, and a plurality of terminals refer to two or more terminals.

Moreover, the terms "first" and "second" are merely intended for a purpose of description, and shall not be understood as an indication or implication of relative importance or implicit indication of an indicated technical feature. Therefore, a feature limited by "first" or "second" may explicitly or implicitly include one or more features. The terms "include", "have", and their variants all mean "include but are not limited to", unless otherwise further emphasized in another manner.

Figure 1:
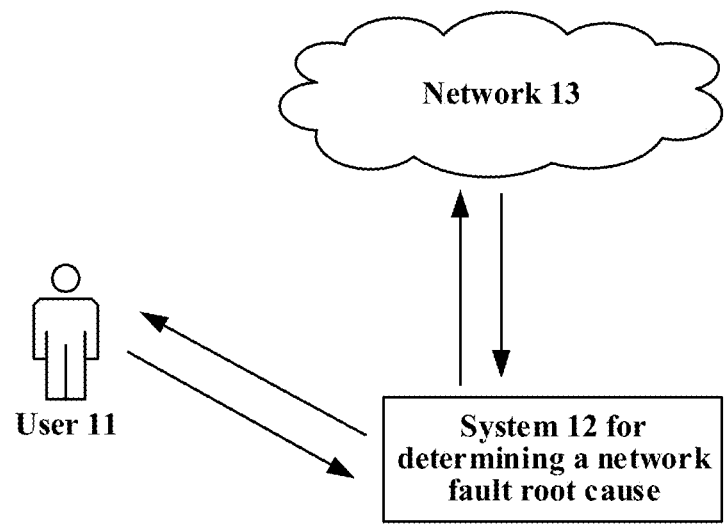
FIG. 1 is a schematic diagram of an architecture of an application scenario according to an embodiment of this disclosure.

FIG. 1 is a schematic diagram of an architecture of an application scenario 100 according to an embodiment of this disclosure. The architecture of the application scenario includes a user 11, a system 12 for determining a network fault root cause, and a network 13. The user 11 may be operation and maintenance personnel who performs network operation and maintenance. The system 12 for determining a network fault root cause may perform man-machine interaction with the user 11. The user provides, based on a fault symptom that occurs on a network device or a service in a faulty network, target network fault information to the system 12 for determining a network fault root cause, so that the system for determining a network fault root cause may determine a network fault type and identification information of a fault object based on the target network fault information. In this way, the system 12 for determining a network fault root cause may detect a network device causing a network fault or a service deployed on the network device in a targeted manner, so that a fault root cause of a faulty network may be quickly determined. This improves efficiency of determining the network fault root cause.

In some embodiments, a type of the network 13 may be an Internet Protocol (IP) network, an asynchronous transfer mode (ATM) network, or the like, or may be a mobile network, a fixed network, a mobile fixed convergence network, or the like, or may be a local area network, a metropolitan area network, or a wide area network, or may be an access network, a core network, a transmission network, or the like.

A plurality of network devices are set in the network 13, where the network devices may be routers, switches, hubs, bridges, gateways, or network devices of other types, and types of the network devices may be the same or may be different.

The foregoing describes an application scenario of embodiments of this disclosure. The following describes in detail a system for determining a network fault root cause in embodiments of this disclosure.

In this solution, the system for determining a network fault root cause may have at least a function of performing man-machine interaction with a user, storing information, and communicating with another device.

Figure 2:
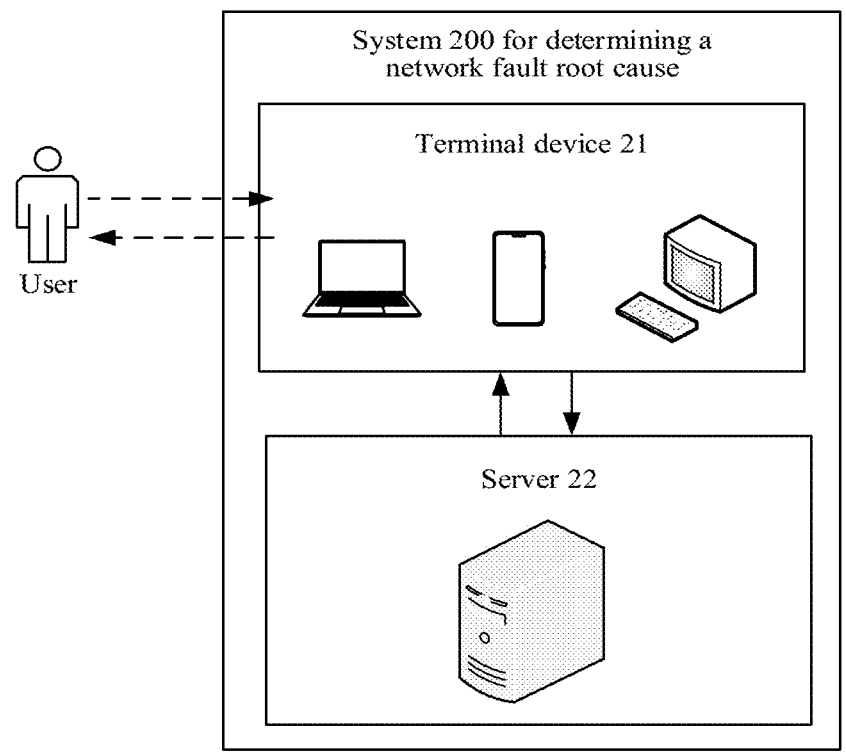
FIG. 2 is a schematic diagram of an architecture of a system for determining a network fault root cause according to an embodiment of this disclosure.

FIG. 2 is a schematic diagram of an architecture of a system 200 for determining a network fault root cause according to an embodiment of this disclosure. As shown in FIG. 2, the system 200 for determining a network fault root cause provided in embodiments of this disclosure may include a terminal device 21 and a server 22. The terminal device 21 may perform man-machine interaction with a user through a man-machine interaction interface. The terminal device 21 and the server 22 may be connected to each other through a network such as a wired network or a wireless network, to exchange data. It may be understood that a network between the terminal device 21 and the server 22 may be implemented by using any known network communication protocol. The network communication protocol may be various wired or wireless communication protocols, such as Ethernet, Universal Serial Bus (USB), firewire, Global System for Mobile Communications (GSM), General Packet Radio Service (GPRS), code-division multiple access (CDMA), wideband CDMA (WCDMA), time-division CDMA (TD-SCDMA), Long-Term Evolution (LTE), New Radio (NR), BLUETOOTH, and WI-FI.

In this solution, the user, namely, network operation and maintenance personnel, may determine target network fault information based on a symptom of a faulty network device or service in a faulty network, and enter the target network fault information through the man-machine interaction interface. After receiving the target network fault information entered by the user, the terminal device 21 may send the target network fault information to the server 22. After receiving the target network fault information, the server 22 may determine an intention of the user based on the target network fault information, to be specific, may determine, in a targeted manner, identification information of a fault object on which fault detection needs to be performed and a network fault type. Next, the server 22 determines a fault root cause detection task based on the identification information of the fault object and the network fault type. Finally, the server 22 performs fault detection on the fault object based on the identification information of the fault object and the fault root cause detection task, to obtain a fault root cause of the faulty network. In this way, the user provides the terminal device 21 with the target network fault information, and the server 22 may determine the network fault type and the fault object that encounters a fault in the faulty network in a targeted manner, to perform diagnosis on a network fault in a targeted manner, to obtain the network fault root cause, without analyzing a large amount of alarm information. This improves efficiency of determining the network fault root cause.

Based on the system for determining a network fault root cause provided in the foregoing embodiments, the following describes in detail components of the system for determining a network fault root cause.

Figure 3:
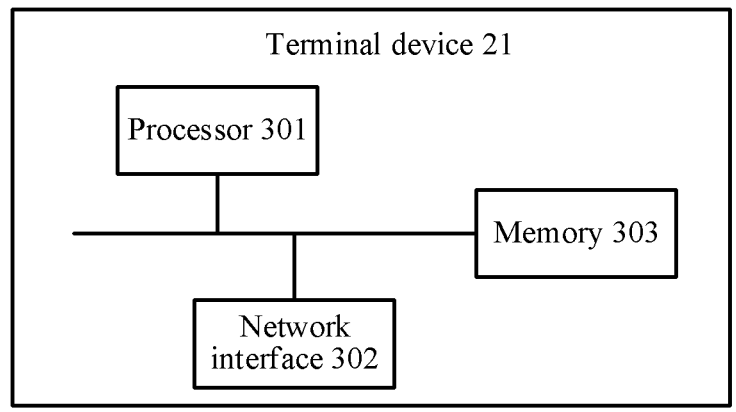
FIG. 3 is a schematic diagram of a structure of a terminal device according to an embodiment of this disclosure.

The terminal device 21 involved in this solution refers to a device used by network operation and maintenance personnel for network operation and maintenance. The terminal device 21 may have at least a function of performing man-machine interaction with the user, storing received data, and communicating with the server 22. FIG. 3 is a schematic diagram of an architecture of a terminal device according to an embodiment of this disclosure. As shown in FIG. 3, the terminal device 21 may include a processor 301, a network interface 302, and a memory 303. The processor 301, the network interface 302, and the memory 303 may be connected to each other through a bus or in another manner.

In this solution, the processor 301 (or a central processing unit (CPU)) is a computing core and a control core of the terminal device. In an example, the processor 301 may process received information, and the like. The network interface 302 may include a standard wired interface and a standard wireless interface (such as WI-FI, a mobile communication interface, or the like), and is controlled by the processor 301 to receive and send information. In an example, the terminal device 21 communicates with the server 22 through the network interface 302, and sends or receives information to or from the server 22. The memory 303 is a memory device of the terminal device 21, and is configured to store a program and data, for example, store information that is entered by a user and that is collected by the terminal device, and information sent by the server. It may be understood that the memory 303 may be a high-speed random-access memory (RAM), or may be a non-volatile memory, for example, at least one magnetic disk memory. Optionally, the memory 303 may be further at least one storage apparatus located far away from the processor 301. The memory 303 provides storage space. The storage space stores an operating system and executable program code of the terminal device 21, and may include but is not limited to a WINDOWS system (an operating system), a LINUX system (an operating system), and the like. This is not limited herein.

In some embodiments, the terminal device 21 may be a mobile phone, a tablet computer, a wearable device, a smart television, a smart screen, a vehicle-mounted infotainment, or the like.

In some embodiments, the terminal device 21 may further have a sensor configured to collect information. For example, the sensor may be a sensor configured to collect a sound signal, for example, a microphone, or the like.

The server 22 involved in this solution may be a server or a hyper terminal that may establish a communication connection to the terminal device 21 and may provide an information processing function, an operation function, and/or a storage function for the terminal device. The server 22 in this solution may be a hardware server, or may be embedded in a virtualized environment. For example, the server involved in this solution may be a virtual machine executed on a hardware server including one or more other virtual machines, or may be a cloud server.

Figure 4:
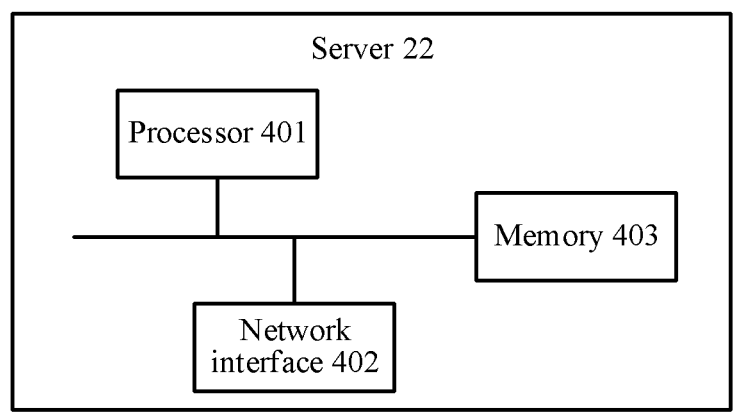
FIG. 4 is a schematic diagram of a structure of a server according to an embodiment of this disclosure.

FIG. 4 is a schematic diagram of a structure of a server according to an embodiment of this disclosure. As shown in FIG. 4, the server 22 includes a processor 401, a network interface 402, and a memory 403. The processor 401, the network interface 402, and the memory 403 may be connected to each other through a bus or in another manner. In this solution, the processor 401 (or CPU) is a computing core and a control core of the server 22. In some embodiments, the processor 401 may determine a network fault type and identification information of a fault object based on target network fault information, determine a fault root cause detection task based on the network fault type and the identification information of the fault object, and perform fault detection on the fault object based on the fault root cause detection task, to obtain a fault root cause of a faulty network. The network interface 402 may include a standard wired interface and a standard wireless interface (such as WI-FI, a mobile communication interface, or the like), and is controlled by the processor 401 to receive and send information, for example, receive target network fault information sent by a terminal device. The memory 403 is a memory device of the server, and is configured to store a program and data, for example, store information sent by the terminal device 21. It may be understood that the memory 403 may be a high-speed RAM, or may be a non-volatile memory, for example, at least one magnetic disk memory, or may be at least one storage apparatus located far away from the processor 301. The memory 303 provides storage space, and the storage space stores an operating system and executable program code of the server. The memory 403 provides storage space. The storage space stores an operating system and executable program code of the server, and may include but is not limited to a WINDOWS system (an operating system), a LINUX system (an operating system), a HARMONYOS (an operating system), and the like. This is not limited herein.

Figure 5A:
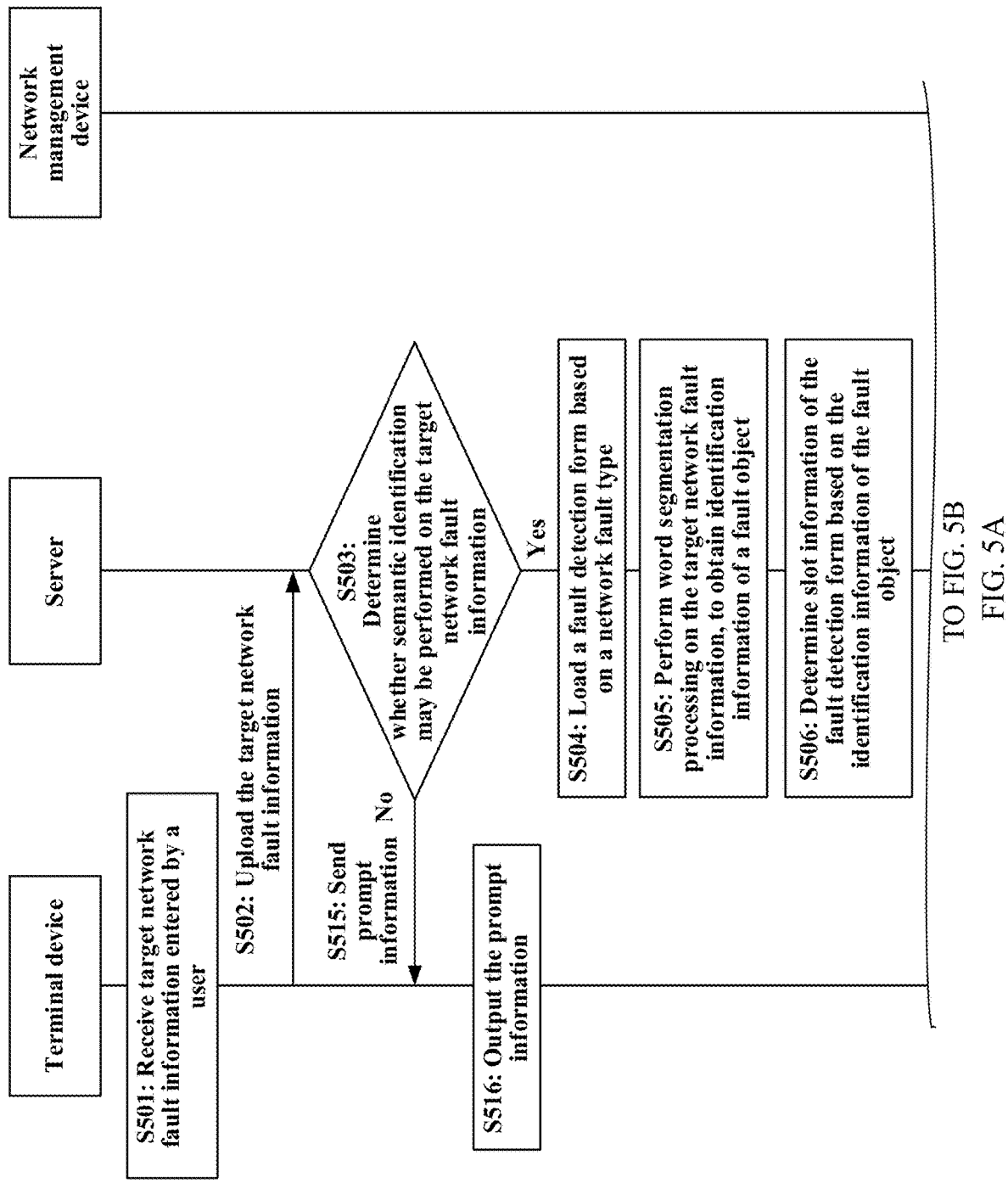
FIG. 5A and FIG. 5B are schematic sequence diagrams of a solution for determining a network fault root cause according to an embodiment of this disclosure.
Figure 5B:
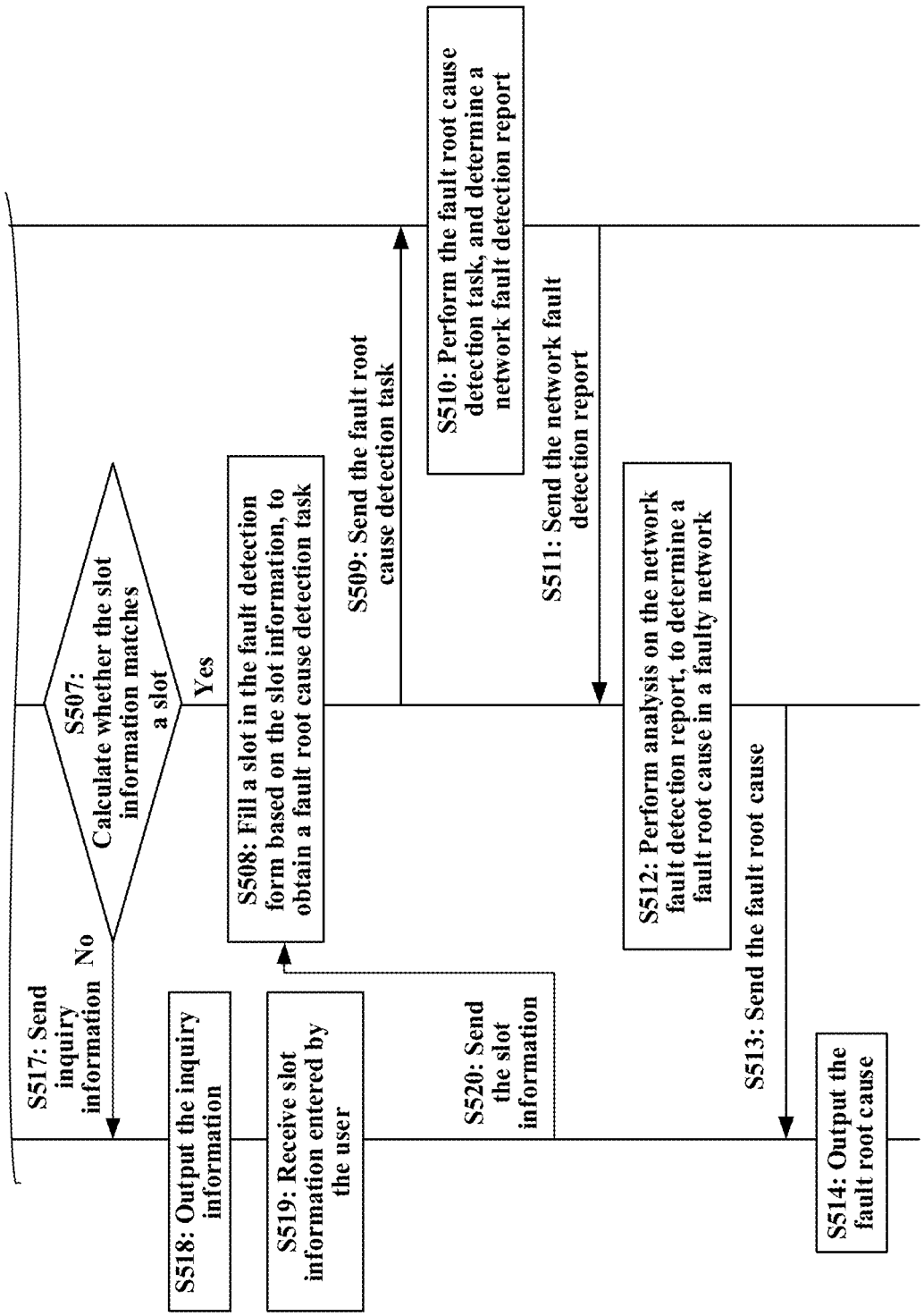

The following describes in detail a solution for determining a network fault root cause in this solution based on the system for determining a network fault root cause described in FIG. 2 and a process for determining a network fault root cause shown in FIG. 5A and FIG. 5B.

As shown in FIG. 5A and FIG. 5B, the solution for determining a network fault root cause provided in embodiments of this disclosure includes step S501 to step S504.

S501: A terminal device 21 receives target network fault information entered by a user.

In this solution, the user may determine a fault symptom of a fault object based on a running state of a network device or a running state of a service, where the fault object includes the network device or the service. According to a fault symptom of the network device or the service, the user may enter the target network fault information through a man-machine interaction interface of the terminal device 21. The target network fault information indicates that at least one network device or at least one service is faulty in a faulty network. For example, a base station between Daoxianghu and Financial street is disconnected from a network, and a private line customer complains about network disconnection.

In some embodiments, the user may enter the target network fault information in a plurality of forms. For example, the target network fault information entered by the user may be in a text form, or may be in a voice form, or the like. In an example, the terminal device may include a display unit and an input unit. The input unit has at least a function of receiving information entered by the user. For example, the input unit may be a touch sensor, or may be a voice receiving unit, or the like. The terminal device 21 may display a man-machine interaction interface through the display unit, and receive, in combination with the touch sensor, the target network fault information entered by the user through the man-machine interaction interface. In this way, the target network fault information received by the terminal device may be information in a text form. The terminal device 21 may further display the man-machine interaction interface through the display unit, so that the user may trigger a wake-up function of the voice receiving unit through the man-machine interaction interface, and the voice receiving unit may receive a voice of the user. In this way, the target network fault information received by the terminal device 21 may be information in a voice form.

In some embodiments, to enable the terminal device 21 to more accurately determine the target network fault information, the target network fault information of the user may be further determined in a manner of a predictive input. The user may enter a network fault keyword through the man-machine interaction interface of the terminal device, where the network fault keyword is a word describing a fault symptom of a faulty network device or a faulty service in a faulty network. The user may enter the network fault keyword in a voice form or a text form. After determining the network fault keyword, the terminal device 21 may send the network fault keyword to the server 22, and the server 22 matches at least one piece of network fault information based on the network fault keyword. The network fault information may be information including the network fault keyword. The network fault information may be preconfigured by the user based on a possible fault situation of a network, and indicates that a network or a service is faulty. After obtaining the at least one piece of network fault information through matching, the server 22 sends the at least one piece of network fault information to the terminal device 21. The terminal device 21 displays the at least one piece of network fault information through the man-machine interaction interface, so that the user selects the at least one piece of network fault information, to determine the target network fault information. In some implementations, the at least one piece of network fault information may be further provided to the user in a form of a voice dialog.

S502: The terminal device 21 uploads the target network fault information to the server 22.

In this solution, after receiving the target network fault information selected by the user, the terminal device 21 may upload the target network fault information to the server 22, and the server 22 determines the network fault root cause. This reduces occupation of computing resources in the terminal device 21.

S503: The server 22 determines whether semantic identification may be performed on the target network fault information, and if yes, obtains a network fault type, and performs S504, or if no, performs S515.

In this solution, the server 22 may perform analysis on the target network fault information, to determine the network fault type. The network fault type is obtained by performing analysis on the target network fault information. The network fault type may also refer to an intention of the user, and further, the network fault type is targeted and directional, so that the server 22 may perform fault detection on the network device in a targeted manner, and determine a fault root cause of the network fault. This improves efficiency of determining the fault root cause.

In some embodiments, the server 22 may perform semantic analysis on the target network fault information by using a pre-trained semantic analysis model.

In an example, the server 22 may generate, based on a fault feature when a fault occurs in a network in a historical time period, network fault sample information and a network fault type corresponding to the network fault sample information. For example, if the network fault is caused by base station disconnection, the network fault sample information that may be generated is "a base station from a place A to a place B is disconnected from a network", and the network fault type is the base station disconnection. A semantic analysis model is trained based on the network fault sample information and the network fault type corresponding to the network fault sample information. The target network fault information is input into the trained semantic analysis model, to determine the network fault type. The semantic analysis model may alternatively be obtained by training by another device having a computing function, and the trained semantic analysis model is uploaded to the server 22.

In some embodiments, to ensure generalization of the semantic analysis model and accuracy of information obtained through semantic analysis, the server 22 may further perform incremental learning on the semantic analysis model. The server 22 may perform incremental learning on the trained semantic analysis model based on historical network fault information and a network fault type corresponding to the historical network fault information. The historical network fault information may be fault information generated based on a fault that may occur in a network, or may be fault information obtained by collecting statistics on service data generated in a network environment. For example, the server 22 may store the target network fault information entered by the user when a fault occurs in a network, and use the target network fault information as the historical network fault information. The network fault type corresponding to the historical network fault information may be determined by the user based on the historical network fault information. For example, the user may upload the network fault type corresponding to the historical network fault information to the server 22 in a man-machine interaction manner. The server 22 may store a plurality of pieces of historical fault information and a network fault type corresponding to each piece of historical fault information, and use the plurality of pieces of historical fault information and the network fault type corresponding to each piece of historical fault information as a sample for performing incremental learning on the semantic analysis model.

The server 22 may perform incremental learning on the semantic analysis model based on a preset periodicity. The server 22 may further perform incremental learning on the semantic analysis model when an amount of historical network fault information reaches a preset threshold. In an incremental learning process, the server 22 may continuously adjust a parameter of the semantic analysis model, so that the semantic analysis model may identify a plurality of intentions of the user. This improves generalization of the semantic analysis model.

In some embodiments, the trained semantic analysis model may perform analysis on the network fault information. The server 22 receives the target network fault information entered by the user, the semantic analysis model may identify the network fault type of the user, and the server may output the network fault type to the terminal device 21, so that the terminal device 21 may display the network fault type. In this way, the user may further confirm correctness of the network fault type. This ensures accuracy of determining the network fault type.

S504: The server 22 loads a fault detection form based on the network fault type.

The server 22 stores fault detection forms corresponding to different network fault types, and the fault detection forms include slots corresponding to the network fault types. The fault detection form may be a solution for performing fault detection on a fault object. The fault detection form may include a subtask of performing fault detection on the fault object. Because identification information of different fault objects is different, the fault detection form does not include a parameter required for performing the subtask. However, at least one slot is set in the fault detection form, and the slot is a name corresponding to the parameter required for performing the subtask. For example, when fault detection is performed on the base station, the parameter required for performing the subtask is an identity of the base station. An identity of a base station A is A, and the slot is the identity.

The fault detection form may be stored in the server 22 in a form of a script, and the server 22 may invoke a script corresponding to the network fault type based on the network fault type of the user.

In some embodiments, the fault detection form involved in this solution may be preconfigured in the server 22.

Before S504, orchestrating network fault detection subtasks based on different network fault types may be further included, to obtain the fault detection form. The network fault type may be predefined by the user based on operation and maintenance experience, and a network fault detection subtask corresponding to each network fault type is defined based on the network fault type and the operation and maintenance experience of the user. The user may orchestrate the network fault detection subtask after performing man-machine interaction with the terminal device 21. For example, the user may trigger a task orchestration interface, to orchestrate the network fault detection subtask. The user may enter a network fault type defined by the user on the task orchestration interface. For each network fault type, the user enters the defined network fault detection subtask on the task orchestration interface. The terminal device 21 responds to an input by the user, completes orchestration of the network fault detection subtask, generates the fault detection form, and associates an identity document (ID) of the network fault type with the fault detection form, to generate a mapping relationship between the network fault type and the fault detection form.

S505: The server 22 performs word segmentation processing on the target network fault information, to obtain identification information of a fault object.

The target network fault information may include a name of the fault object, a location of the fault object, and/or the like.

In some embodiments, the server 22 may perform word segmentation processing on the target network fault information by using a relative score algorithm, to determine the identification information of the fault object. The relative score algorithm may be a best match 25 (BM25) algorithm.

In an example, after receiving the target network fault information sent by the terminal device 21, the server 22 may perform word segmentation processing on the target network fault information, to obtain at least one word corresponding to the target network fault information. For example, if the target network fault information is "a base station from Daoxianghu to Financial street is disconnected", words obtained after word segmentation are Daoxianghu, To, Financial Street, Base Station, and Disconnected.

A database in the server 22 may store documents corresponding to a plurality of fault objects and historical network fault detection tasks. The documents corresponding to the fault objects include the identification information of the fault object, for example, a name of the fault object and location information of the fault object. The historical fault detection task may be set by the user based on historical service data. The historical service data includes data for performing network fault detection when a network fault occurs, for example, a network fault detection log, or the like. The historical fault detection task may be stored in the server 22 in a form of a document.

After performing word segmentation processing on the target network fault information, the server 22 may calculate a word frequency of each word based on a document corresponding to the fault object. The server 22 may further calculate an inverted index weight of each word based on the historical fault detection task. For example, an inverted index is performed on a document corresponding to the historical fault detection task, to obtain an inverted index weight of each word. For an $i^{th}$ word Qi in the target network fault information Q, the server 22 may collect statistics on a quantity of documents including the word Qi, and then calculate the inverted index weight of the word Qi based on a total quantity stored in the database and a quantity of documents including the word Qi. An inverted index weight (IDF (Qi)) of the word Qi=lg (a total quantity of documents/a quantity of documents including the word Qi).

Then, the server 22 may calculate a relative matching score between each word and the historical fault detection task. The historical fault detection task includes an object name, for example, a device name, a service name, or the like of a network device. The server 22 may calculate a score obtained when each word matches an object name of an object name in the historical fault detection task, namely, a relative matching score.

The server 22 may calculate the relative score of the word based on the word frequency of the word, the inverted index weight of the word, and the relative matching score. A relative score (Score (Q)) of the target network fault information Q meets the following formula (1):

$$\text{Score}(Q) = \sum_{i}^{n} \frac{IDF(Qi) \times \text{tf\_i} \times (ki + 1)}{\text{tf\_i} \times ki \times (1 - b + b \times (dl/avgdl))} / S \quad (1)$$

n represents a quantity of words obtained after word segmentation is performed on the target network fault information, tf_i represents a word frequency of an $i^{th}$ word, ki represents a score threshold adjustment factor of the $i^{th}$ word, b represents an entity length weight adjustment factor, dl represents a length (a quantity of words in an object name) of a name of a network device in a historical fault detection task, avgdl represents an average length of names of all network devices in the historical fault detection task, and S represents a score obtained when an entity is fully matched, i=1, 2, 3, or the like. The score threshold adjustment factor and the entity length weight adjustment factor of the $i^{th}$ word may be preset values. ki may be 1.2, and b may be 0.75. This is not limited herein.

The identification information of the fault object is determined based on a preset score threshold and a relative score of each word. The server 22 may filter out a word whose relative score is less than the preset score threshold. Then, the identification information of the fault object is matched in the database based on the remaining words. In a process of matching the identification information of the fault object, matching may be further performed with reference to semantics of the target network fault information. For example, if the target network fault information is "a base station from Daoxianghu to Financial street is disconnected", the server 22 may determine that a location of the base station is between Daoxianghu and Financial street, and there are a base station A and a base station B between Daoxianghu and Financial street. In this case, the server 22 may match device information of the base station A and device information of the base station B in the database in a targeted manner based on the location.

In some embodiments, when the server 22 matches a large quantity of network devices or services through the word, the server 22 may generate prompt information, to prompt the user that there are too many matched fault objects.

For example, after obtaining the relative score of each word through calculation, the server 22 may match a service name corresponding to each word. Service names are sorted in ascending order of relative scores. Service names whose relative scores are greater than the preset score threshold are filtered out, and a list of remaining service names is generated. In addition, when the quantity of remaining service names is greater than the preset quantity threshold, the prompt information may be generated, and the prompt information is sent to the terminal device 21, so that the terminal device 21 displays the prompt information, to prompt the user that too many service names are currently matched. The user may re-enter the service name, so that the server 22 determines the identification information of the fault service.

In some other embodiments, when the server 22 identifies too much identification information of the fault object, the server 22 may send the identification information of the plurality of fault objects to the terminal device 21. The terminal device 21 may display the identification information of the plurality of fault objects through the man-machine interaction interface, and the user selects the identification information of the target fault object from the identification information of the plurality of fault objects through the man-machine interaction interface. Next, the terminal device 21 sends identification information of a target fault object to the server 22, so that the server 22 determines the identification information of the target fault object.

If the target network fault information entered by the user is "a base station from Daoxianghu to Financial street is disconnected", after performing analysis on the target network fault information, the server 22 may determine that the identification information of the fault object is the base station from Daoxianghu to Financial street. There are 10 base stations from Daoxianghu to Financial street, and names of the 10 base stations are respectively a base station A to a base station J. To further ensure efficiency of fault detection, the server 22 may send names of the 10 base stations to the terminal device 21, and the terminal device 21 displays the names of the 10 base stations through the man-machine interaction interface. Then, the user may select a name of a target base station through the man-machine interaction interface. Then, the terminal device 21 sends the name of the target base station to the server 22. Finally, the server 22 matches an identity of the target base station in the database based on the name of the target base station and a location (for example, from Daoxianghu to Financial street) of the target base station.

S506: The server 22 determines slot information of the fault detection form based on the identification information of the fault object.

The server 22 may determine the slot information of the fault detection form based on the identification information of the fault object, to obtain the fault root cause detection task. It should be noted that the fault detection form does not include the slot information, and the fault root cause detection task refers to a fault detection form in which the slot information is filled. The identification information of the fault object may include a name of the fault object, a location of the fault object, and an ID of the fault object.

In some embodiments, the server 22 may fill a slot in the fault detection form based on the identification information of the fault object. For example, a network fault type is that slot information corresponding to a fault detection form corresponding to "base station disconnection" includes an ID of the base station and an IP of the base station. If the server 22 identifies that the identification information of the base station includes the name of the base station and the location of the base station, the server 22 may obtain the ID and the IP of the base station through matching from the database based on the name of the base station and the location of the base station.

In some embodiments, a mapping relationship between different network fault types and slots may be preconfigured in the server 22. To ensure accuracy of network fault detection, after determining the network fault type and the identification information of the fault object, the server 22 may match, based on the network fault type, a slot required for network fault detection. When the server matches too many slots, the server 22 may send a plurality of slots to the terminal device 21. The terminal device 21 displays the plurality of slots through the man-machine interaction interface. The user selects a target slot from the man-machine interaction interface. After receiving an input of selecting the target slot by the user, the terminal device 21 sends the target slot selected by the user to the server 22. The server 22 performs network fault type matching based on the target slot, to be specific, matches, based on a stored correspondence between different network fault types and slots, a network fault type corresponding to the target slot. When the network fault type identified by the server 22 based on the target network fault information is different from the network fault type corresponding to the target slot, the network fault type identified by the server 22 based on the target network fault information is switched to the network fault type corresponding to the target slot, to correct the network fault type based on an input by the user. This ensures accuracy of subsequent fault detection.

S507: The server 22 calculates whether the slot information matches a slot, and if yes, performs S508, or if no, performs S517.

In this solution, the slot in the fault detection form may include at least one slot. To ensure accuracy of filling a slot, before filling a slot, the server 22 may calculate whether the slot information matches the slot, for example, whether a quantity of slots and the slot information correspond to the slot, or the like.

S508: The server 22 fills a slot in the fault detection form based on the slot information, to obtain a fault root cause detection task.

Filling is performed on the slot in the fault detection form corresponding to the slot information, to generate a fault root cause detection task. For example, the slot includes the name of the fault object and the ID of the fault object, and the slot information includes the base station and the ID of the base station. In this case, the slot corresponding to the base station is the name of the fault object, and the slot corresponding to the ID of the base station is the ID of the fault object.

In some embodiments, the fault detection form may include a plurality of slots. The plurality of slots include a mandatory slot and an optional slot. For example, the mandatory slot in the fault detection form corresponding to base station disconnection may include an identity of the base station. The optional slot information may include location information of the base station. In a process of filling the slot in the fault detection form, the server 22 may detect whether the identification information of the fault object includes slot information corresponding to the mandatory slot. When the identification information of the fault object does not include the slot information corresponding to the mandatory slot, the server 22 may further determine the slot information of the mandatory slot based on the identification information of the fault object.

In an example, when the identification information of the fault object does not include the slot information corresponding to the mandatory slot, the server 22 may match the slot information of the mandatory slot from the database based on the identification information of the fault object. For example, the identification information of the fault object is "a base station at a location A", and the network fault type is "base station disconnection". A mandatory slot in the fault detection form corresponding to "base station disconnection" is the ID of the base station, and the server 22 may match, based on the location A, the ID of the base station set at the location A from the database. Next, the server 22 fills the matched ID of the base station in the mandatory slot, and generates a fault root cause detection task for base station disconnection at the location A.

In another example, when the identification information of the fault object does not include the slot information corresponding to the mandatory slot, the server 22 may enter inquiry information corresponding to the mandatory slot. For example, the identification information of the fault object is "a base station A", and the network fault type is "base station disconnection". The mandatory slot in the fault detection form corresponding to the base station disconnection is the ID of the base station, and the server 22 may generate the inquiry information "what is the IP of the base station", and the like. The server sends the inquiry information to the terminal device 21. After receiving the inquiry information, the terminal device 21 may display the inquiry information on the man-machine interaction interface, and the user may enter the ID of the base station based on the inquiry information. After receiving an input by the user, the terminal device sends the ID of the base station to the server 22. After receiving the ID of the base station, the server 22 fills a slot in the fault detection form, to generate the fault root cause detection task.

S509: The server 22 sends the fault root cause detection task to a network management device.

The network management device refers to a device that manages each node in a network. The network management device has a function of at least being capable of obtaining status information of each node in a network, for example, status information of a network device, status information of a service, and the like. After determining the fault root cause detection task, the server 22 needs to send the fault root cause detection task to the network management device.

S510: The network management device performs the fault root cause detection task, and determines a network fault detection report.

After receiving the fault root cause detection task, the network management device may perform fault detection on the fault object based on the fault root cause detection task. The network management device may determine status information of the fault object by performing the fault root cause detection task. For example, in a process in which the network management device performs fault detection on the network device, the network management device may obtain status information of a software module and a hardware module in the network device. In a process in which the network device performs fault detection on the service, the network device may obtain alarm information, and the like in a service running process. The network management device generates the network fault detection report based on the obtained status information of the fault object.

Figure 6:
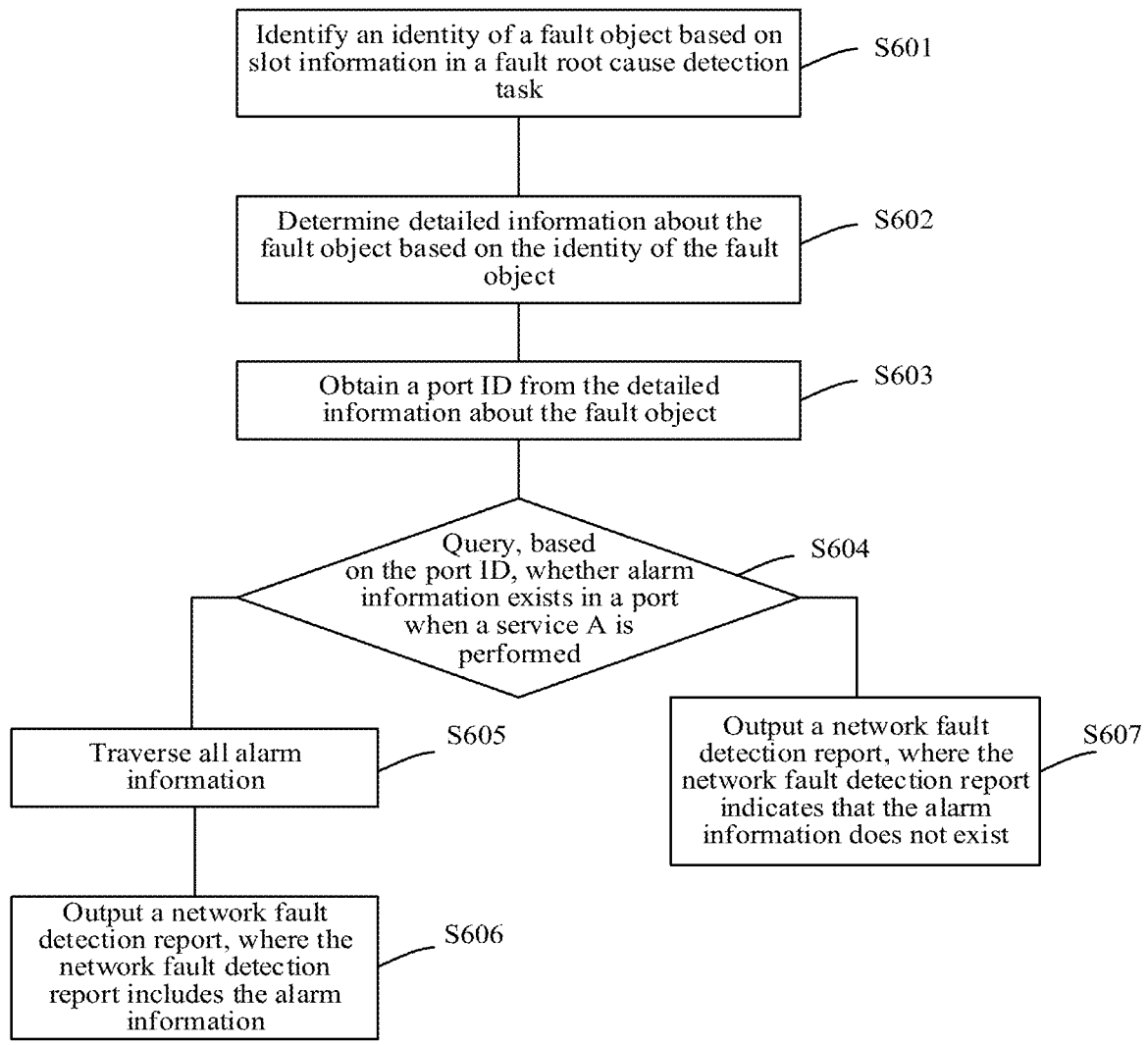
FIG. 6 is a schematic flowchart of generating a fault detection report according to an embodiment of this disclosure.

In an example, as shown in FIG. 6, the solution for performing fault detection by the network management device provided in embodiments of this disclosure may include S601 to S607.

S601: Identify an identity of a fault object based on slot information in a fault root cause detection task.

For example, the network management device may determine the identity of the fault object based on the slot information, for example, a name of the fault object, an ID of the fault object, or the like.

S602: Determine detailed information about the fault object based on the identity of the fault object.

The detailed information about the fault object may refer to information related to the fault object in a running process, for example, an ID of an entity related to a service, an ID of an entity related to a network device, and the like, for example, a port ID.

S603: Obtain a port ID from the detailed information about the fault object.

For example, if the fault object is a service A, a port ID related to the service A needs to be identified from the detailed information about the service A.

S604: Query, based on the port ID, whether alarm information exists in a port when a service A is performed, and if yes, perform S605, or if no, perform S607.

S605: Traverse all alarm information.

S606: Output a network fault detection report, where the network fault detection report includes the alarm information.

S607: Output the network fault detection report, where the network fault detection report indicates that the alarm information does not exist.

In some embodiments, the server 22 may also perform the network fault detection task, to detect the fault object. This ensures efficiency of network fault detection.

S511: The network management device sends the network fault detection report to the server 22.

In this solution, the network management device may feed back the network fault detection report of the fault object to the server 22. The network fault detection report of the fault object may include information such as a current state of a node that may cause a network fault, for example, a state of a port and a connectivity state of a transmission protocol.

S512: The server 22 performs analysis on the network fault detection report, to determine a fault root cause in a faulty network.

The server 22 performs fault analysis based on the network fault detection report of the fault object, to obtain the fault root cause. For example, if the server 22 determines that a state of the port is a normal state and a connectivity state of the transmission protocol is an abnormal state, it may be determined that the fault root cause is that connectivity of the transmission protocol causes a network fault.

S513: The server 22 sends the fault root cause to a terminal device 21.

S514: The terminal device 21 outputs the fault root cause.

After obtaining the fault root cause through analysis, the server 22 sends the fault root cause to the terminal device 21. The terminal device 21 may output the fault root cause. For example, the terminal device 21 may display the fault root cause through the man-machine interaction interface, so that the user may perform network repair based on the fault root cause. For another example, the terminal device 21 may output the fault root cause in an audio form through an audio output module.

S515: The server 22 sends prompt information to the terminal device 21.

A semantic understanding model in the server 22 cannot identify invalid information entered by the user. For example, the information entered by the user on the man-machine interaction interface is "what is calories of a sweet potato", which is unrelated to the network fault. In this case, the server 22 may generate the prompt information, and send the prompt information to the terminal device 21.

S516: The terminal device 21 outputs the prompt information, to prompt that the target network fault information entered by a user cannot be identified.

After receiving the prompt information, the terminal device 21 may display the prompt information through the man-machine interaction interface. The terminal device may further convert the prompt information into audio, and output audio corresponding to the prompt information through the audio output module.

S517: The server 22 sends inquiry information to the terminal device 21.

In some cases, the slot information identified by the server 22 does not match the slot in the fault detection form. For example, the slot information identified by the server 22 is the name of the base station, but the slot name is the ID of the fault object. In this case, the server 22 may send the inquiry information to the terminal device 21, to query the user about the slot information. In some cases, when an amount of slot information determined based on the identification information of the fault object does not match a quantity of slots, the slot information needs to be queried from the user.

S518: The terminal device 21 outputs the inquiry information.

After receiving the inquiry information, the terminal device 21 may output the inquiry information. For example, the inquiry information may be displayed through the man-machine interaction interface. The inquiry information includes a slot name, so that the user enters the slot information based on the slot name.

S519: The terminal device 21 receives slot information entered by the user.

S520: The terminal device 21 sends the slot information entered by the user to the server 22, and jumps to S508.

After the terminal device 21 sends the slot information entered by the user to the server 22, the server 22 may fill the slot based on the slot information identified by the identification information of the fault object and the slot information entered by the user.

Figure 7:
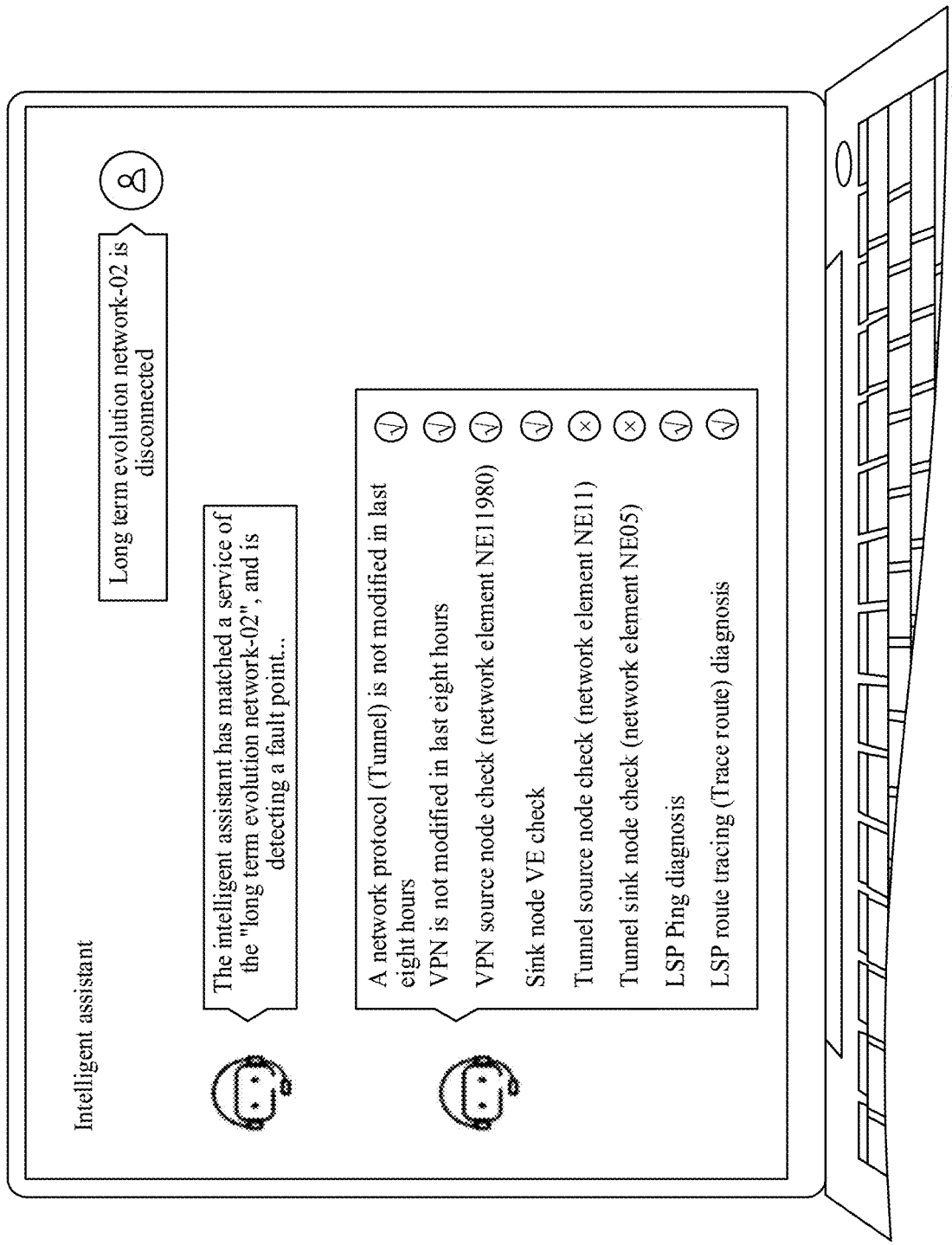
FIG. 7 is a schematic diagram of an interface of a solution for determining a network fault root cause according to an embodiment of this disclosure.
Figure 10:
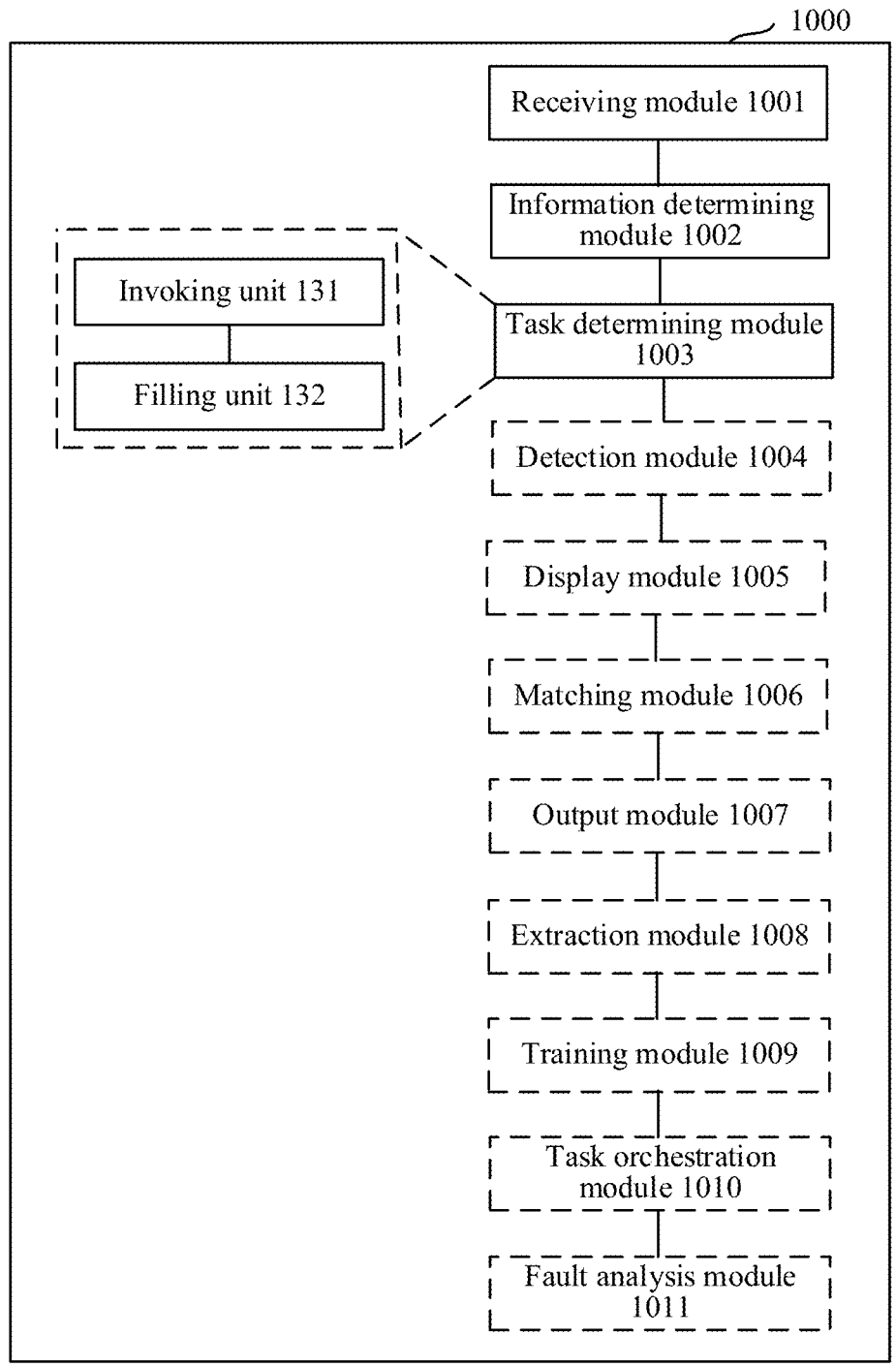
FIG. 10 is a schematic diagram of a structure of an apparatus for determining a network fault root cause according to an embodiment of this disclosure.

It may be understood that the system for determining a network fault root cause provided in embodiments of this disclosure may include a terminal device. In other words, the solution for determining a network fault root cause provided in embodiments of this disclosure may be implemented by the terminal device. The terminal device may be a device such as a conversational operation and maintenance robot, a computer, an industrial computer, a mobile phone, or the like. For example, an intelligent assistant may be set in the terminal device. As shown in FIG. 7, the user may wake up the intelligent assistant through a button disposed on the terminal device or a fixed gesture, and input the target network fault information, for example, the long term evolution network-02 is disconnected. After receiving the target network fault information, the terminal device performs the solution for determining a network fault root cause in the foregoing embodiments, to determine the fault root cause of the faulty network. As shown in FIG. 10, when the intelligent assistant matches the service the "long term evolution network-02", the terminal device may prompt, through the man-machine interaction interface, the user that "the service of the long term evolution network-02 has been matched", and a fault point is being detected. After performing fault detection, the terminal device may display a state of a node related to the fault object. For example, a state of a detected fault point of the "long term evolution network-02" may be shown in FIG. 7. The state of the fault point may be indicated through a text. For example, a network protocol (Tunnel) is not modified in last eight hours, and a virtual private network (VPN) is not modified in last eight hours. Alternatively, a state of each fault point may be represented through an identifier, for example, a normal state may be represented through a symbol "V". The abnormal state may be represented by the symbol "x". For example, VPN source node check (network element NE11980), sink node virtual network (VE) check, Tunnel source node check (network element NE11), Tunnel sink node check (network element NE05), label switched path (LSP) packet internet groper (Ping) diagnosis, and internet service provider (ISP) route tracing (Trace route) diagnosis.

For a function that may be implemented by the terminal device, refer to the foregoing description of the system for determining a network fault root cause. Details are not described herein again.

In the solution for determining a network fault root cause provided in embodiments of this disclosure, network operation and maintenance personnel enters the target network fault information based on a faulty network device or service. A network fault type and a fault object that needs to be detected may be determined based on the target network fault information. A fault root cause detection task may be determined based on the network fault type and the identification information of the fault object, and then fault detection is performed on the fault object. In this way, the fault object that needs to be detected and a detection task that needs to be performed when the fault object is detected may be determined in a targeted manner through the target network fault information entered by the user, so that the network fault root cause is determined, and there is no need to perform logical analysis on a large amount of alarm information. This improves efficiency of determining the network fault root cause.

The following describes another system for determining a network fault root cause according to an embodiment of this disclosure.

Figure 8:
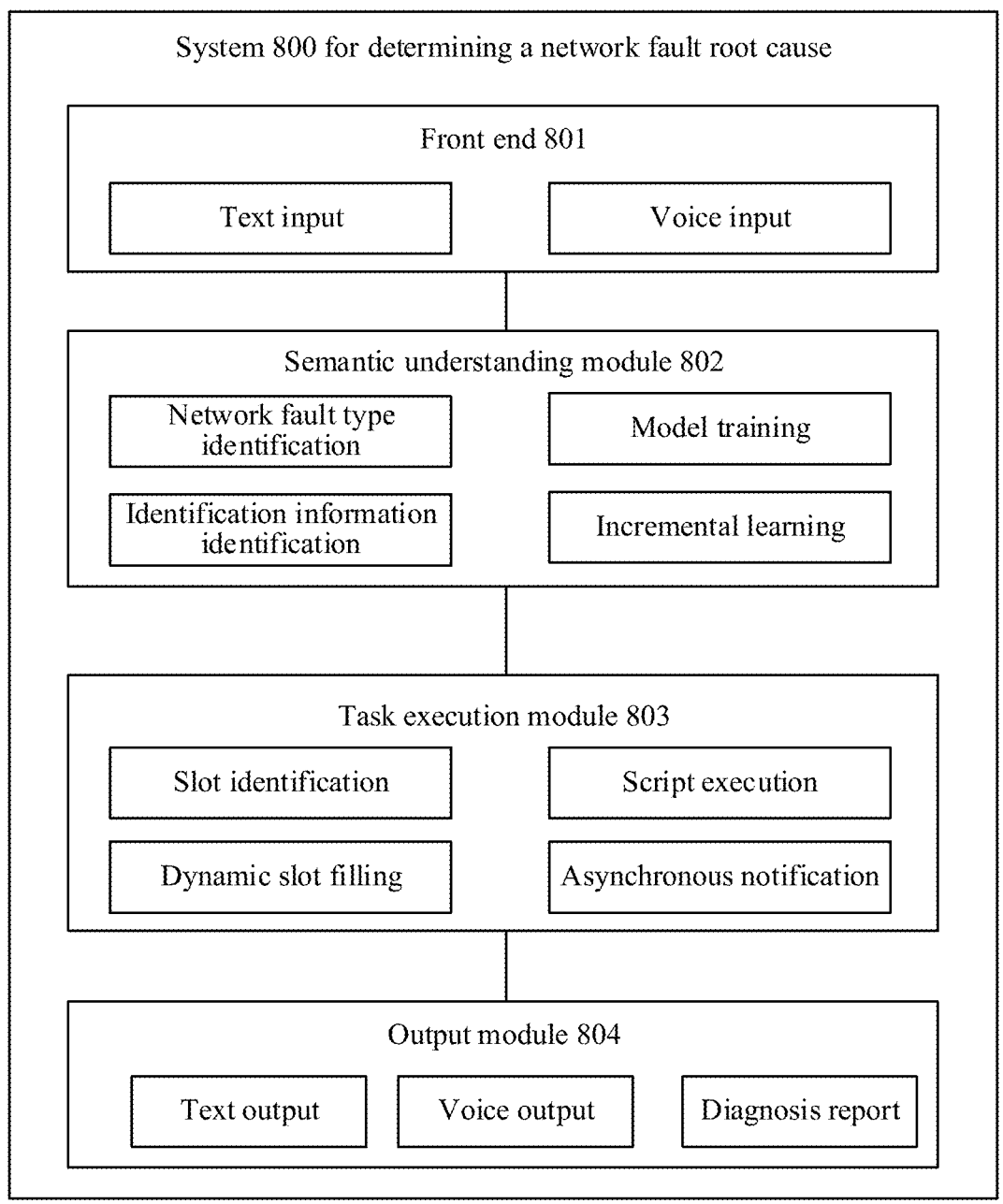
FIG. 8 is a schematic diagram of an architecture of another system for determining a network fault root cause according to an embodiment of this disclosure.

FIG. 8 is a schematic diagram of an architecture of another system 800 for determining a network fault root cause according to an embodiment of this disclosure. As shown in FIG. 8, the system 800 for determining a network fault root cause provided in embodiments of this disclosure may include a front end 801, a semantic understanding module 802, a task execution module 803, and an output module 804.

In this solution, the front end 801 has at least a function of performing man-machine interaction with a user, and the front end 801 may receive inputs in different forms, for example, a voice input and a text input, to receive target network fault information entered by the user. The front end 801 may be considered as the terminal device in the embodiment corresponding to FIG. 2. The front end 801 is configured to receive the target network fault information entered by the user. It may be understood that for a function implemented by the front end 801, refer to the description of the terminal device in the embodiment corresponding to FIG. 2. Details are not described herein again.

The semantic understanding module 802 has at least a semantic analysis function, to perform semantic analysis on the target network fault information entered by the user, and identify a network fault type and identification information of a fault object. For example, the semantic understanding module 802 may include a semantic analysis model. The semantic understanding module may perform model training on the semantic analysis model, and may perform incremental learning on the trained semantic analysis model, to continuously adjust a parameter of the semantic analysis model, and improve generalization of the semantic analysis model.

The task execution module 803 has at least a function of identifying slot information. The task execution module 803 is configured to load, based on the network fault type determined by the semantic understanding module 802, a script corresponding to a fault detection form, identify a slot required in the script, determine slot information based on the identification information of the fault object, and dynamically fill a slot in the script based on the slot information, to obtain a fault root cause detection task. The task execution module 803 executes the script, to complete fault detection and determine a fault root cause of a network fault. In addition, the task execution module 803 further has a result notification function. When execution time of the fault root cause detection task is long, the user cannot be notified of a result of fault detection in time. In this case, the task execution module 803 may register a task, so that after the task is executed, the user is notified of a fault detection result. This implements real-time and asynchronous notification.

It should be noted that both the semantic understanding module 802 and the task execution module 803 may be considered as modules in the server in the embodiment shown in FIG. 2. For functions implemented by the semantic understanding module 802 and the task execution module 803, refer to the description of the server in the embodiment corresponding to FIG. 2. Details are not described herein again.

The output module 804 has at least a function of outputting text data and a function of outputting voice data, so that a detection report of fault detection may be output. In a possible case, the output module 804 may output a detection report of fault detection to the front end 801. In other words, the output module 804 may be an output module in the server. In another possible case, the front end 801 may receive a detection report generated by the task execution module, and output the detection report through the output module 804. In other words, the output module 804 may be an output module in the front end 801.

The following describes, based on the foregoing described solution for determining a network fault root cause, a method for determining a network fault root cause provided in embodiments of this disclosure. It may be understood that the method is another expression manner of the foregoing solution for determining a network fault root cause, and the method and the solution are combined. The method is proposed based on the foregoing described solution for determining a network fault root cause. For some or all of the method, refer to the foregoing description of the foregoing solution for determining a network fault root cause.

Figure 9:
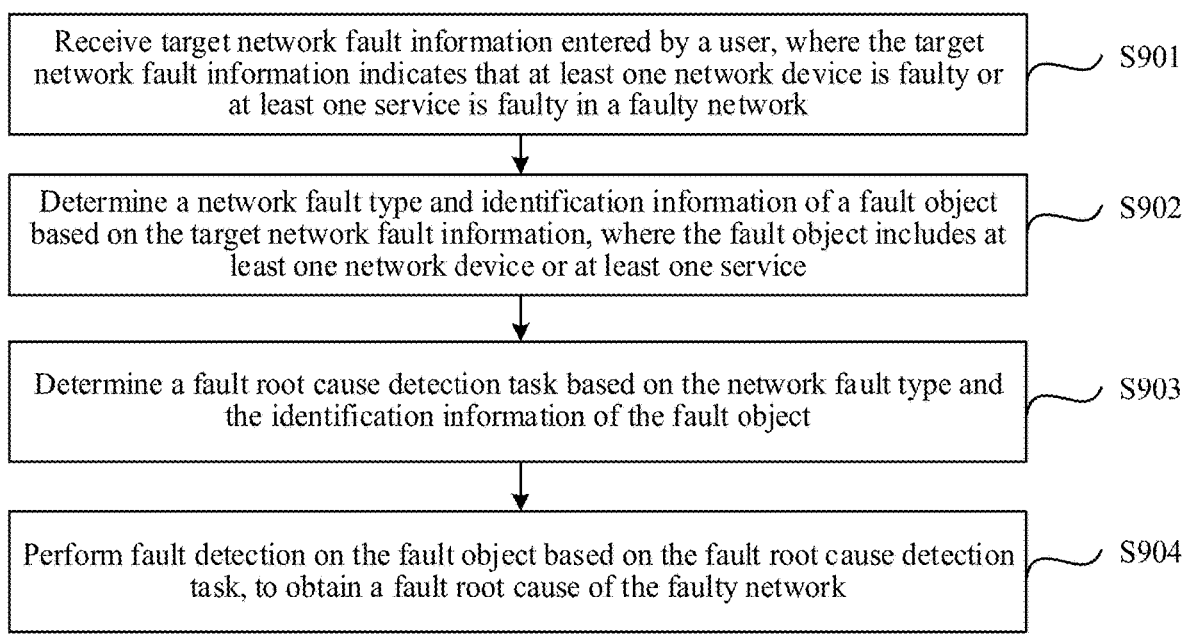
FIG. 9 is a schematic flowchart of a method for determining a network fault root cause according to an embodiment of this disclosure.

FIG. 9 is a schematic flowchart of a method for determining a network fault root cause according to an embodiment of this disclosure. It may be understood that the method may be performed through any apparatus, device, platform, or device cluster that has a computing capability and a processing capability. As shown in FIG. 9, the method for determining a network fault root cause provided in embodiments of this disclosure may include S901 to S904.

S901: Receive target network fault information entered by a user, where the target network fault information indicates that at least one network device is faulty or at least one service is faulty in a faulty network.

In this solution, the user (network operation and maintenance personnel) may determine a fault symptom of a fault object based on a running state of the network device or a running state of the service, where the fault object includes the network device or the service. According to a fault symptom of the network device or the service, the user may enter the target network fault information through a man-machine interaction interface of the terminal device 21. The target network fault information indicates that at least one network device or at least one service is faulty in a faulty network. For example, a base station between Daoxianghu and Financial street is disconnected from a network, and a private line customer complains about network disconnection. The user may enter the target network fault information in a plurality of forms. For example, the target network fault information entered by the user may be in a text form, or may be in a voice form, or the like.

In some embodiments, the target network fault information may be further obtained in a manner of a predictive input. First, a second input of the user is received, then, in response to the second input, a network fault keyword is extracted from the second input, next, at least one piece of network fault information that includes the network fault keyword is matched, next, at least one piece of network fault information is displayed, next, a third input of the user is received, and finally, the target network fault information is determined in response to the third input, where the at least one piece of network fault information includes the target network fault information. This ensures flexibility of obtaining the target network fault information.

For a specific implementation of S902, refer to the description of S501 in the foregoing embodiments. Details are not described herein again.

S902: Determine a network fault type and identification information of a fault object based on the target network fault information, where the fault object includes the at least one network device or the at least one service.

In this solution, semantic analysis may be performed on the target network fault information, to determine the network fault type and the identification information of the fault object.

In some embodiments, semantic analysis is performed on the target network fault information, to determine the network fault type and the identification information of the fault object.

For example, semantic analysis may be performed on the target network fault information through a pre-trained semantic analysis model, to obtain the network fault type. Based on a fault feature when a fault occurs in a network in a historical time period, the network fault sample information and a network fault type corresponding to the network fault sample information are generated. For example, if the network fault is caused by base station disconnection, the network fault sample information that may be generated is "a base station from a place A to a place B is disconnected from a network", and the network fault type is the base station disconnection. A semantic analysis model is trained based on the network fault sample information and the network fault type corresponding to the network fault sample information. The target network fault information is input into the trained semantic analysis model, to determine the network fault type.

In some embodiments, word segmentation processing may be performed on the target network fault information, to obtain the identification information of the fault object. Word segmentation processing may be performed on the target network fault information by using a relative score algorithm, to determine the identification information of the fault object. For example, a BM25 algorithm. First, word segmentation processing is performed on the target network fault information, to obtain at least one word corresponding to the target network fault information, then, a word frequency of each word is calculated based on identification information of a plurality of fault objects stored in a database, next, an inverted index weight of a word is calculated based on a historical fault detection task stored in the database, next, a relative matching score between the target network fault information and the historical fault detection task is calculated, next, a relative score of the word is calculated based on the word frequency of the word, the inverted index weight of the word, and the relative matching score of the word, and finally, the identification information of the fault object is determined based on the preset score threshold and the relative score.

For a specific implementation of S902, refer to the description of S505 in the foregoing embodiments. Details are not described herein again.

In some embodiments, to ensure generalization of the semantic analysis model and accuracy of information obtained through semantic analysis, the server 22 may further perform incremental learning on the semantic analysis model. The server 22 may perform incremental learning on the trained semantic analysis model based on the historical network fault information and the network fault type corresponding to the historical network fault information. The historical network fault information may be fault information generated based on a fault that may occur in a network, or may be fault information obtained by collecting statistics on service data generated in a network environment.

In this solution, because the network fault type is obtained by performing analysis on the target network fault information entered by the user, the network fault type may also refer to an intention of the user, and further, the network fault type is targeted and directional, so that fault detection may be performed on the network device in a targeted manner, and a fault root cause of the network fault is determined. This improves efficiency of determining the fault root cause.

S903: Determine a fault root cause detection task based on the network fault type and the identification information of the fault object.

In this solution, first, a fault detection form corresponding to the network fault type is invoked, and then, slot information of a plurality of slots in the network fault detection form is filled in based on the identification information of the fault object, to obtain the fault root cause detection task. The fault detection form includes at least one slot, for example, a name of the fault object, an ID of the fault object, or the like. The slot information corresponding to the slot may be extracted from the identification information of the fault object, and the slot corresponding to the slot information is filled in, to generate the fault root cause detection task. The fault detection form is obtained by orchestrating network fault detection subtasks based on different network fault types.

In some embodiments, when the identification information of the fault object does not include the slot information of the mandatory slot in the plurality of slots, the slot information of the plurality of slots in the network fault detection form may be filled in based on the identification information of the fault object and the slot information of the mandatory slot, to obtain a fault root cause detection task. This ensures that fault detection is performed on the fault object.

In some other embodiments, when the identification information of the fault object does not include the slot information of the mandatory slot in the plurality of slots, inquiry information corresponding to the mandatory slot may be further output, then, a first input of the user is received, next, in response to the first input, the slot information of the mandatory slot is extracted from the first input, and finally, slot information of a plurality of slots in the network fault detection form is filled in based on the identification information of the fault object and the slot information of the mandatory slot, to obtain the fault root cause detection task.

For a specific implementation of S903, refer to the description of S506 to S508 in the foregoing embodiments. Details are not described herein again.

S904: Perform fault detection on the fault object based on the fault root cause detection task, to obtain a fault root cause of the faulty network.

In this solution, first, the fault root cause detection task is sent to the network management device based on the identification information of the fault object, so that the network management device performs the fault root cause detection task, to obtain status information of the fault object, next, the status information fed back by the network management device is received, and finally, fault analysis is performed based on the status information, to obtain the fault root cause.

In some embodiments, in this solution, a fault root cause may be further displayed on the network fault interaction interface, so that a faulty network is repaired based on the fault root cause. This ensures normal running of the network.

In the method for determining a network fault root cause provided in embodiments of this disclosure, the user (network operation and maintenance personnel) may determine a fault symptom of a fault object based on a running state of the network device or a running state of the service, where the fault object includes the network device or the service. According to a fault symptom of the network device or the service, the user may enter the target network fault information through a man-machine interaction interface of the terminal device 21. The target network fault information indicates that at least one network device or at least one service is faulty in a faulty network. For example, a base station between Daoxianghu and Financial street is disconnected from a network, and a private line customer complains about network disconnection. The user may enter the target network fault information in a plurality of forms. For example, the target network fault information entered by the user may be in a text form, or may be in a voice form, or the like.

Based on the method for determining a network fault root cause provided in the foregoing embodiments, embodiments of this disclosure further provide an apparatus for determining a network fault root cause. The following describes the apparatus for determining a network fault root cause.

FIG. 10 is a schematic diagram of a structure of an apparatus 1000 for determining a network fault root cause according to an embodiment of this disclosure. As shown in FIG. 10, the apparatus 1000 for determining a network fault root cause provided in embodiments of this disclosure may include a receiving module 1001, an information determining module 1002, a task determining module 1003, and a detection module 1004.

The receiving module 1001 is configured to receive target network fault information entered by a user, where the target network fault information indicates that at least one network device is faulty or at least one service is faulty in a faulty network, the information determining module 1002 is configured to determine a network fault type and identification information of a fault object based on the target network fault information, the task determining module 1003 is configured to determine a fault root cause detection task based on the network fault type and the identification information of the fault object, where the fault object includes the at least one network device or the at least one service, and the detection module 1004 is configured to perform fault detection on the fault object based on the fault root cause detection task, to obtain a fault root cause of the faulty network.

In a possible implementation, the apparatus further includes a display module 1005 configured to display the fault root cause on a network fault interaction interface, to repair the faulty network based on the fault root cause.

In a possible implementation, the task determining module 1003 includes an invoking unit 131 configured to invoke a fault detection form corresponding to the network fault type, and a filling unit 132 configured to fill in slot information of a plurality of slots in the network fault detection form based on the identification information of the fault object, to obtain the fault root cause detection task.

In a possible implementation, the apparatus further includes a matching module 1006 configured to, when the identification information of the fault object does not include slot information of a mandatory slot in the plurality of slots, match the slot information of the mandatory slot from a database based on the identification information of the fault object, and the filling unit 132 configured to fill in the slot information of the plurality of slots in the network fault detection form based on the identification information of the fault object and the slot information of the mandatory slot, to obtain the fault root cause detection task.

In a possible implementation, the apparatus further includes an output module 1007 configured to output inquiry information corresponding to a mandatory slot when the identification information of the fault object does not include slot information of the mandatory slot in the plurality of slots, the receiving module 1001, further configured to receive a first input of the user, an extraction module 1008 configured to extract the slot information of the mandatory slot from the first input in response to the first input, and the filling unit 132 configured to fill in the slot information of the plurality of slots in the network fault detection form based on the identification information of the fault object and the slot information of the mandatory slot, to obtain the fault root cause detection task.

In a possible implementation, the information determining module 1002 is configured to perform semantic analysis on the target network fault information, to determine the network fault type and the identification information of the fault object.

In a possible implementation, the information determining module 1002 is configured to perform semantic analysis on the target network fault information, to determine the network fault type, and perform word segmentation processing on the target network fault information, to determine the identification information of the fault object.

In a possible implementation, the information determining module 1002 is configured to perform word segmentation processing on the target network fault information, to obtain at least one word corresponding to the target network fault information, calculate a word frequency of each word based on identification information of a plurality of fault objects stored in a database and service information configured by each network device, calculate an inverted index weight of the word based on a historical fault detection task stored in the database, calculate a relative matching score between the target network fault information and the historical fault detection task, calculate a relative score of the word based on the word frequency of the word, the inverted index weight of the word, and a relative matching score of the word, and determine the identification information of the fault object based on a preset score threshold and the relative score.

In a possible implementation, the information determining module 1002 is configured to input the target network fault information into a pre-trained semantic analysis model, and determining the network fault type, where the semantic analysis model is obtained by training based on network fault sample information and a network fault type corresponding to the network fault sample information.

In a possible implementation, the apparatus further includes a training module 1009 configured to perform incremental learning on the semantic analysis model based on historical network fault information and a network fault type corresponding to the historical network fault information.

In a possible implementation, the apparatus further includes a task orchestration module 1010 configured to orchestrate network fault detection subtasks based on different network fault types, to obtain a fault detection form corresponding to each network fault type.

In a possible implementation, the detection module 1004 is configured to send the fault root cause detection task to a network management device, to enable the target device to perform the fault root cause detection task, to obtain status information of the fault object, the receiving module 1001 is further configured to receive the status information fed back by the network management device, and the apparatus further includes a fault analysis module 1011 configured to perform fault analysis based on the status information, to obtain the fault root cause.

In a possible implementation, the receiving module 1001 is configured to receive a second input of the user, an extraction module 1008 is configured to extract a network fault keyword from the second input in response to the second input, a matching module 1006 is configured to match at least one piece of network fault information that includes the network fault keyword, a display module 1005 is configured to display the at least one piece of network fault information, the receiving module 1001 is configured to receive a third input of the user, and the information determining module 1002 is configured to determine the target network fault information in response to the third input, where the at least one piece of network fault information includes the target network fault information.

According to the apparatus for determining a network fault root cause provided in embodiments of this disclosure, network operation and maintenance personnel enters the target network fault information based on a faulty network device or service. A network fault type and a fault object that needs to be detected may be determined based on the target network fault information. A fault root cause detection task may be determined based on the network fault type and the identification information of the fault object, and then fault detection is performed on the fault object. In this way, the fault object that needs to be detected and a detection task that needs to be performed when the fault object is detected may be determined in a targeted manner through the target network fault information entered by the user, so that the network fault root cause is determined, and there is no need to perform logical analysis on a large amount of alarm information. This improves efficiency of determining the network fault root cause.

The method steps in embodiments of this disclosure may be implemented in a hardware manner, or may be implemented in a manner of executing software instructions by the processor. The software instructions may include corresponding software modules. The software modules may be stored in a RAM, a flash memory, a read-only memory (ROM), a programmable ROM (PROM), an erasable PROM (EPROM), an electrically EPROM (EEPROM), a register, a hard disk, a removable hard disk, a compact disc (CD) ROM (CD-ROM), or any other form of storage medium well-known in the art. For example, a storage medium is coupled to a processor, so that the processor can read information from the storage medium and write information into the storage medium. Certainly, the storage medium may be a component of the processor. The processor and the storage medium may be disposed in an application-specific integrated circuit (ASIC).

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to embodiments of this disclosure are all or partially generated. The computer may be a general-purpose computer, a dedicated computer, a computer network, or other programmable apparatuses. The computer instruction may be stored in a computer-readable storage medium, or may be transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DIGITAL VERSATILE DISC (DVD)), a semiconductor medium (for example, a solid-state drive (SSD)), or the like.

It may be understood that various numbers in embodiments of this disclosure are merely used for differentiation for ease of description, and are not used to limit the scope of embodiments of this disclosure.

What is claimed is:

1. A method comprising:
receiving, from a user, target network fault information indicating that at least one network device is faulty or at least one service is faulty in a faulty network;
determining, based on the target network fault information, a first network fault type and first identification information of a fault object, wherein the fault object comprises the at least one network device or the at least one service;
determining, based on the first network fault type and the first identification information, a fault root cause detection task by:
  invoking a fault detection form corresponding to the first network fault type;
  making an identification that the first identification information does not comprise first slot information of a mandatory slot in the fault detection form;
  retrieving, in response to the identification and based on the first identification information, the first slot information from a database; and
  filling in the fault detection form using the first slot information and the first identification information to obtain the fault root cause detection task;
performing, based on the fault root cause detection task, fault detection on the fault object to obtain a fault root cause of the faulty network; and
displaying the fault root cause on a network fault interaction interface to repair the faulty network based on the fault root cause.

2. The method of claim 1, further comprising:
outputting, in response to the identification, inquiry information corresponding to the mandatory slot;
receiving, from the user, a first input; and
extracting, from the first input in response to the first input, the first slot information.

3. The method of claim 1, wherein determining the first network fault type and the first identification information comprises performing semantic analysis on the target network fault information to determine the first network fault type and the first identification information.

4. The method of claim 3, further comprising performing word segmentation processing on the target network fault information to determine the first identification information.

5. The method of claim 4, further comprising:
further performing the word segmentation processing on the target network fault information to obtain at least one word corresponding to the target network fault information;
calculating, based on second identification information of fault objects stored in a database, a word frequency of the at least one word;
calculating, based on a historical fault detection task stored in the database, an inverted index weight of the at least one word;
calculating a relative matching score that is of the at least one word and that is between the target network fault information and the historical fault detection task;
calculating, based on the word frequency, the inverted index weight, and the relative matching score, a relative score of the at least one word; and
determining, based on a preset score threshold and the relative score, the first identification information.

6. The method of claim 4, further comprising:
training, based on network fault sample information and a second network fault type corresponding to the network fault sample information, a semantic analysis model; and
inputting the target network fault information into the semantic analysis model to determine the first network fault type.

7. The method of claim 6, further comprising performing, based on historical network fault information and a third network fault type corresponding to the historical network fault information, incremental learning on the semantic analysis model.

8. An apparatus comprising:
a memory configured to store instructions; and
a processor coupled to the memory and configured to execute the instructions to cause the apparatus to:
  receive, from a user, target network fault information indicating that at least one network device is faulty or at least one service is faulty in a faulty network;
  determine, based on the target network fault information, a first network fault type and first identification information of a fault object, wherein the fault object comprises the at least one network device or the at least one service;

determine, based on the first network fault type and the first identification information, a fault root cause detection task by:
  invoking a fault detection form corresponding to the first network fault type;
  making an identification that the first identification information does not comprise first slot information of a mandatory slot in the fault detection form;
  retrieving, in response to the identification and based on the first identification information, the first slot information from a database; and
  filling in the fault detection form using the first slot information and the first identification information to obtain the fault root cause detection task;
perform, based on the fault root cause detection task, fault detection on the fault object to obtain a fault root cause of the faulty network; and
display the fault root cause on a network fault interaction interface to repair the faulty network based on the fault root cause.

9. The apparatus of claim 8, wherein the processor is further configured to execute the instructions to cause the apparatus to:
output, in response to the identification, inquiry information corresponding to the mandatory slot;
receive, from the user, a first input; and
extract, from the first input in response to the first input, the first slot information.

10. The apparatus of claim 8, wherein the processor is further configured to execute the instructions to cause the apparatus to perform semantic analysis on the target network fault information to determine the first network fault type and the first identification information.

11. The apparatus of claim 10, wherein the processor is further configured to execute the instructions to cause the apparatus to perform word segmentation processing on the target network fault information to determine the first identification information.

12. The apparatus of claim 11, wherein the processor is further configured to execute the instructions to cause the apparatus to:
further perform the word segmentation processing on the target network fault information to obtain at least one word corresponding to the target network fault information;
calculate, based on second identification information of fault objects stored in a database and service information configured by the at least one network device, a word frequency of the at least one word;
calculate, based on a historical fault detection task stored in the database, an inverted index weight of the at least one word;
calculate a relative matching score that is of the at least one word and that is between the target network fault information and the historical fault detection task;
calculate, based on the word frequency, the inverted index weight, and the relative matching score, a relative score of the at least one word; and
determine, based on a preset score threshold and the relative score, the first identification information.

13. The apparatus of claim 11, wherein the processor is further configured to execute the instructions to cause the apparatus to:
train, based on network fault sample information and a second network fault type corresponding to the network fault sample information, a semantic analysis model; and
input the target network fault information into the semantic analysis model to determine the first network fault type.

14. The apparatus of claim 13, wherein the processor is further configured to execute the instructions to cause the apparatus to perform, based on historical network fault information and a third network fault type corresponding to the historical network fault information, incremental learning on the semantic analysis model.

15. A non-transitory computer-readable storage medium having stored thereon computer-executable instructions that, when executed by a processor, cause an apparatus to:
receive, from a user, target network fault information indicating that at least one network device is faulty or at least one service is faulty in a faulty network;
determine, based on the target network fault information, a first network fault type and first identification information of a fault object, wherein the fault object comprises the at least one network device or the at least one service;
determine, based on the first network fault type and the first identification information, a fault root cause detection task by:
  invoking a fault detection form corresponding to the first network fault type;
  making an identification that the first identification information does not comprise first slot information of a mandatory slot in the fault detection form;
  retrieving, in response to the identification and based on the first identification information, the first slot information from a database; and
  filling in the fault detection form using the first slot information and the first identification information to obtain the fault root cause detection task;
perform, based on the fault root cause detection task, fault detection on the fault object to obtain a fault root cause of the faulty network; and
display the fault root cause on a network fault interaction interface to repair the faulty network based on the fault root cause.

16. The non-transitory computer-readable storage medium of claim 15, wherein the instructions that, when executed by the processor, cause the apparatus to perform semantic analysis on the target network fault information to determine the first network fault type and the first identification information.

17. The non-transitory computer-readable storage medium of claim 16, wherein the instructions that, when executed by the processor, cause the apparatus to perform word segmentation processing on the target network fault information to determine the first identification information.

18. The non-transitory computer-readable storage medium of claim 17, wherein the instructions that, when executed by the processor, cause the apparatus to:
further perform the word segmentation processing on the target network fault information to obtain at least one word corresponding to the target network fault information;
calculate, based on second identification information of fault objects stored in a database, a word frequency of the at least one word;

calculate, based on a historical fault detection task stored in the database, an inverted index weight of the at least one word;

calculate a relative matching score that is of the at least one word and that is between the target network fault information and the historical fault detection task;

calculate, based on the word frequency, the inverted index weight, and the relative matching score, a relative score of the at least one word; and determine, based on a preset score threshold and the relative score, the first identification information.

19. The non-transitory computer-readable storage medium of claim 17, wherein the instructions that, when executed by the processor, cause the apparatus to:

train, based on network fault sample information and a second network fault type corresponding to the network fault sample information, a semantic analysis model; and input the target network fault information into the semantic analysis model to determine the first network fault type.

20. The non-transitory computer-readable storage medium of claim 19, wherein the instructions that, when executed by the processor, cause the apparatus to perform, based on historical network fault information and a third network fault type corresponding to the historical network fault information, incremental learning on the semantic analysis model.

* * * * *